US011193784B2

(12) United States Patent
Patel et al.

(10) Patent No.: US 11,193,784 B2
(45) Date of Patent: Dec. 7, 2021

(54) END OF TRIP SEQUENCE

(71) Applicant: Waymo LLC, Mountain View, CA (US)

(72) Inventors: Nirmal Patel, Sunnyvale, CA (US); Maria Moon, Mountain View, CA (US); Peter Crandall, San Jose, CA (US); Ryan Powell, San Francisco, CA (US); Hans-olav Cavelie, San Francisco, CA (US); Matthew Hall, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 138 days.

(21) Appl. No.: 15/783,538

(22) Filed: Oct. 13, 2017

(65) Prior Publication Data

US 2019/0113359 A1     Apr. 18, 2019

(51) Int. Cl.
*G01C 21/36* (2006.01)
*G06F 3/0484* (2013.01)
*G06F 16/29* (2019.01)

(52) U.S. Cl.
CPC ..... *G01C 21/3638* (2013.01); *G01C 21/3635* (2013.01); *G01C 21/3647* (2013.01); *G06F 3/04842* (2013.01); *G06F 3/04845* (2013.01); *G06F 16/29* (2019.01); *G06F 2203/04806* (2013.01)

(58) Field of Classification Search
None
See application file for complete search history.

(56) References Cited

U.S. PATENT DOCUMENTS

| | | | |
|---|---|---|---|
| 8,626,434 B1 * | 1/2014 | Kornmann | G01C 21/3638 345/625 |
| 8,831,881 B1 * | 9/2014 | Baig | G01C 21/343 701/533 |
| 8,898,006 B2 | 11/2014 | Miyata | |
| 9,315,151 B2 * | 4/2016 | Taylor | B60C 23/0408 |
| 9,523,984 B1 * | 12/2016 | Herbach | B60W 30/09 |
| 9,599,477 B1 * | 3/2017 | Aula | E05F 15/70 |
| 9,702,722 B2 | 7/2017 | Kim et al. | |
| 9,726,506 B2 | 8/2017 | O'Beirne et al. | |
| 2010/0171828 A1 * | 7/2010 | Ishii | B60R 1/00 348/135 |

(Continued)

*Primary Examiner* — Faris S Almatrahi
*Assistant Examiner* — Hongye Liang
(74) *Attorney, Agent, or Firm* — Botos Churchill IP Law (57) ABSTRACT

Aspects of the disclosure relate to providing an end of trip sequence when a vehicle is nearing its destination. One or more computing devices may generate and display a video indicating a projected trajectory of the vehicle and objects detected by sensors on the vehicle, on a map corresponding to a route the vehicle is currently following, where the video is generated from a perspective of a virtual camera at a default position and default pitch A determination that the vehicle has reached a threshold relative to the route of the vehicle may be made and the position and pitch of the virtual camera may be adjusted to an updated position above the vehicle and a perspective which looks downwards towards a roof of the vehicle. The video may then be generated and displayed from the perspective of the virtual camera at the updated position.

10 Claims, 11 Drawing Sheets

(56) References Cited

U.S. PATENT DOCUMENTS

| | | | |
|---|---|---|---|
| 2011/0095910 A1* | 4/2011 | Takano | B60R 1/00 340/932.2 |
| 2016/0153789 A1* | 6/2016 | Gallar | G01C 21/3635 701/408 |
| 2016/0370194 A1* | 12/2016 | Colijn | G01C 21/343 |
| 2017/0017848 A1* | 1/2017 | Gupta | B60W 30/06 |
| 2018/0244287 A1* | 8/2018 | Kirstein | B62D 15/027 |

* cited by examiner

END OF TRIP SEQUENCE

BACKGROUND

Autonomous vehicles, such as vehicles that do not require a human driver, can be used to aid in the transport of passengers or items from one location to another. Such vehicles may operate in a fully autonomous mode where passengers or a remote operator may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to provide, to occupants of the vehicle, a visual indication of objects detected in the vicinity of a vehicle as well as what those objects are likely to do for some brief period into the future.

To provide occupants of the vehicle with information about the vehicle's environment, a display in the vehicle may present a video generated by a video display system from the perspective of a virtual camera fixed relative to the vehicle at a default position. The video may include imagery within a set field of view corresponding to the position of the virtual camera including a portion of the vehicle's surroundings and the vehicle's projected trajectory.

In addition, messages may be overlaid on the video to inform passengers of the vehicle's actions and information regarding the vehicle's route. For instance, the display may include messages overlaid on the video regarding the vehicle's speed, the street the vehicle is travelling on, and the street's speed limit.

BRIEF SUMMARY

Embodiments within the disclosure relate to systems and methods providing an end of trip sequence when a vehicle is nearing its destination. A method may include generating and displaying, by one or more computing devices, a video indicating a projected trajectory of the vehicle and objects detected by sensors on the vehicle, on a map corresponding to a route the vehicle is currently following, where the video is generated from a perspective of a virtual camera at a default position and default pitch. The one or more computing devices may determine the vehicle has reached a threshold relative to the route of the vehicle and adjust, after the vehicle reaches the threshold, the position and pitch of the virtual camera to an updated position directly above the vehicle and a perspective which looks straight down towards a roof of the vehicle. The video from the perspective of the virtual camera may be generated and displayed at the updated position.

In some embodiments the one or more computing devices may determine the vehicle is approaching the destination, and generate and overlay on the video a message indicating the vehicle is approaching the destination. The adjusting of the virtual camera to the updated position may occur upon determining the vehicle is approaching the destination.

In some embodiments the threshold may be a predefined distance from the destination. In some embodiments the threshold may be a predefined estimated time for the vehicle to arrive at the destination. In some embodiments generating and overlaying on the video a message indicating the vehicle is looking for a pullover location may be based on the determination that the vehicle has reached a threshold.

In some embodiments a determination that a pullover location is found may be made and the virtual camera may be adjusted to an updated position upon determining the pullover location is found.

In some embodiments a trip summary including details of the trip upon the vehicle reaching its destination may be generated and displayed. In some embodiments a walking path overlaid on the video may be generated and displayed, wherein the walking path illustrates a path from the vehicle to a passenger's final destination as the vehicle approaches or reaches a pullover location.

In some embodiments the passenger's final destination may be highlighted in the video, and an image of the destination may be displayed.

Another aspect includes a system for providing an end of trip sequence when a vehicle is nearing its destination. The system may comprise one or more processors. The one or more processors may be configured to generate and display a video indicating a projected trajectory of the vehicle and objects detected by sensors on the vehicle, on a map corresponding to a route the vehicle is currently following, where the video is generated from a perspective of a virtual camera at a default position and default pitch; determine the vehicle has reached a threshold relative to the route of the vehicle; adjust the position and pitch of the virtual camera to an updated position directly above the vehicle and a perspective which looks straight down towards a roof of the vehicle; and generate and display the video from the perspective of the virtual camera at the updated position.

DETAILED DESCRIPTION

Overview

This technology generally relates to providing an end of trip sequence to help give any passengers of a vehicle better context about where the passengers are, as well as what the vehicle is doing as the vehicle approaches and ultimately reaches the destination of the trip. For instance, during a trip to a destination, a computing device may display information to the passengers about how the vehicle "sees" its surrounding environment. This may include displaying a video of the environment, the objects in that environment, and a virtual representation of the vehicle.

The video may be displayed from the perspective of a virtual camera angled above and behind the vehicle. In this regard, computing devices within the vehicle may provide data including a vehicle's projected trajectory as well as data indicating objects, such as other vehicles, within the vicinity of the vehicle. This data may be used to generate the video from the perspective of a virtual camera using the received data by overlaying the vehicle's projected trajectory and detected objects on a map. The map may correspond to an area of a route on which the vehicle is traveling or following.

Some threshold period of time or distance along the route before arriving at the destination, the sequence may begin by overlaying a message on the video which informs the passenger that the vehicle is approaching the destination. As the vehicle approaches the destination, another message may be displayed, or the video being displayed may be changed to indicate that the vehicle is looking for a location to pull over.

Upon the pullover location being found, the position and angle of the virtual camera angle may be changed, for instance moving from the aforementioned angle above and behind the vehicle to an adjusted position directly overhead and positioned downward toward the vehicle. This can occur while the vehicle is still moving, for instance as the vehicle is parking, or after the vehicle has come to a complete stop. The video may be displayed from the perspective of the camera in the adjusted position to provide a more informative perspective for a passenger that is about to exit the vehicle.

A summary of the trip and additional details may be displayed as any passengers leave the vehicle. For instance, information concerning the trip, such as the trips length, time, and destination may be displayed. In some instances, a walking path may be displayed from the virtual representation of the vehicle to the destination to further inform the passenger how they may reach their destination 1070. This information may thus be very helpful the passengers to not only understand their current location, but also to allow them to more easily reach their destination.

The features described herein may allow a vehicle, such as an autonomous vehicle, to provide any passengers with context about the vehicle's surroundings while the vehicle approaches its destination as well as information on how the passenger may reach their final destination after exiting the vehicle by way of a video. Such information may allow the passenger time to prepare to exit the vehicle before the trip has ended. Additionally, passengers are provided with information regarding the vehicle's actions which can provide a sense of reassurance and safety to the passengers. Moreover, such information may relieve a passenger's anxiety about reaching their final destination after exiting the vehicle.

Example Systems

Figure 1:
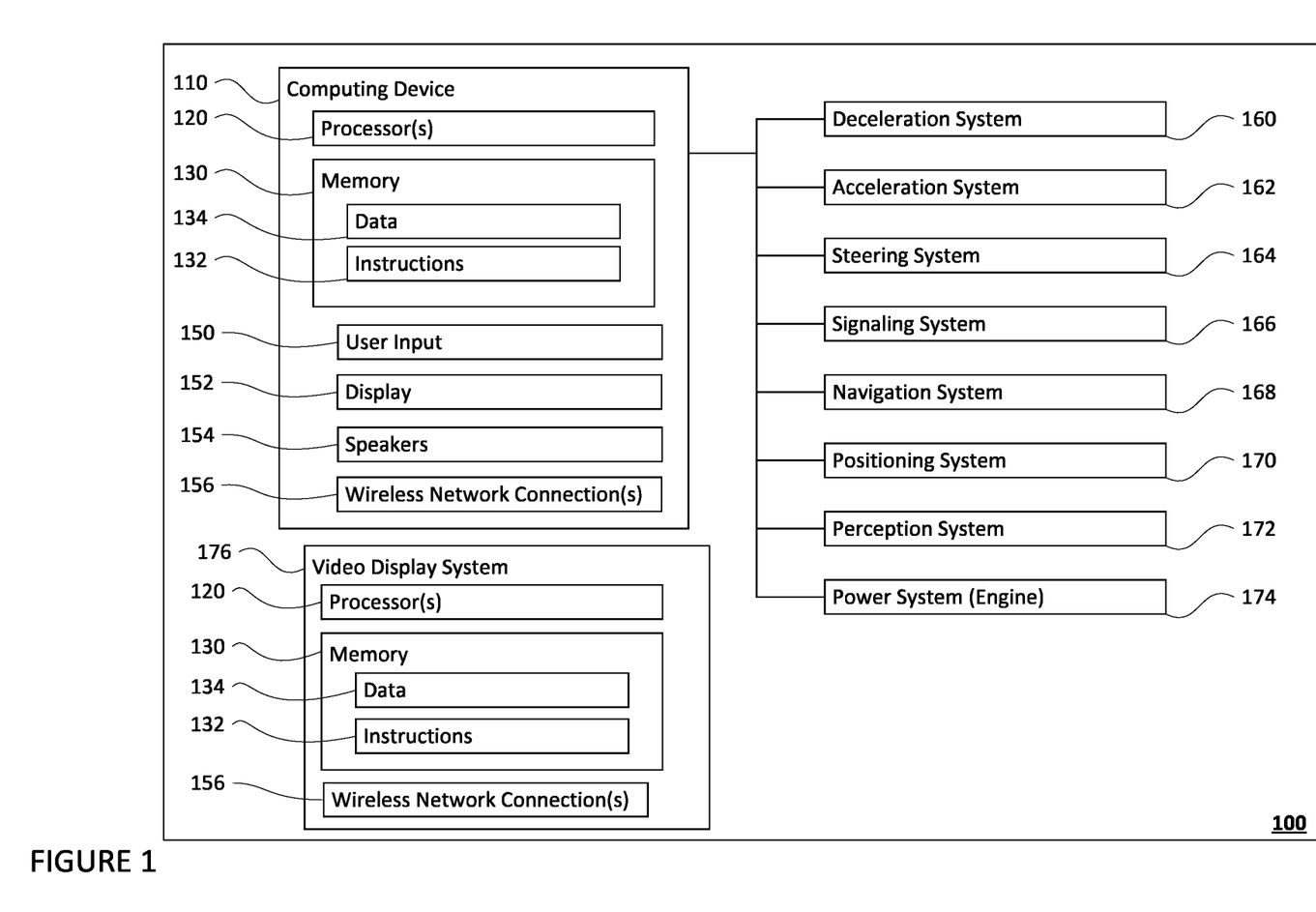
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, perception system 172, and video display system 176 in order to control the movement, acceleration, speed, operation, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed and acceleration of the vehicle. For example, the acceleration system 162 may provide signals to the engine 174 to accelerate at a particular rate. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways Positioning system 170 may be used by computing device 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing device 110. As discussed in further detail below, computing device 110 may use the positioning system 170 to determine the vehicle's location and perception system 172 to detect and respond to objects when needed to reach the location safely.

The video display system 176 may monitor data from the systems of the vehicle to generate a video of the vehicle's surroundings for display in the vehicle. In this regard, the video display system 176 may monitor system data generated by the other computing devices regarding the vehicle's operation including data representing the vehicle's past, present, and future operation. The vehicle display system may also monitor messages sent to and from the vehicle's computing device 110, which is in communication with the different systems and computing devices of the vehicle. For instance, the video display system may aggregate data from the vehicle's perception system 172, such as objects external to the vehicle within a particular range, data from the positioning system 170, such as the vehicle's current location, and data from the navigation system 168, such as the vehicle's projected trajectory and map information, as described above.

The video display system may take the monitored data and messages and generate a video of the vehicle's surroundings and the vehicle's projected trajectory. In this regard, the video may include imagery within a set field of view corresponding to the position of a virtual camera including a portion of the vehicle's surroundings and the vehicle's projected trajectory. In this regard, the video display system 176 may overlay the vehicle's projected trajectory and detected objects on a map corresponding to the route the vehicle is traveling. The video generated by the video display system 176 may be presented to the vehicle's passengers, other individuals, or recorded for future viewing, such as on a display in the vehicle.

The video display system may include some or all of the components of the computing device 110 as described herein, such as processor 120, memory 130, data 134, instructions 132, and wireless network connections 156. Likewise, in addition to, or alternatively to the functions of the video display system described herein, the video display system may perform the functions of a computing device 110. In this regard, the video display system may communicate with the various systems of the vehicle, such as systems 160-174.

Figure 2:
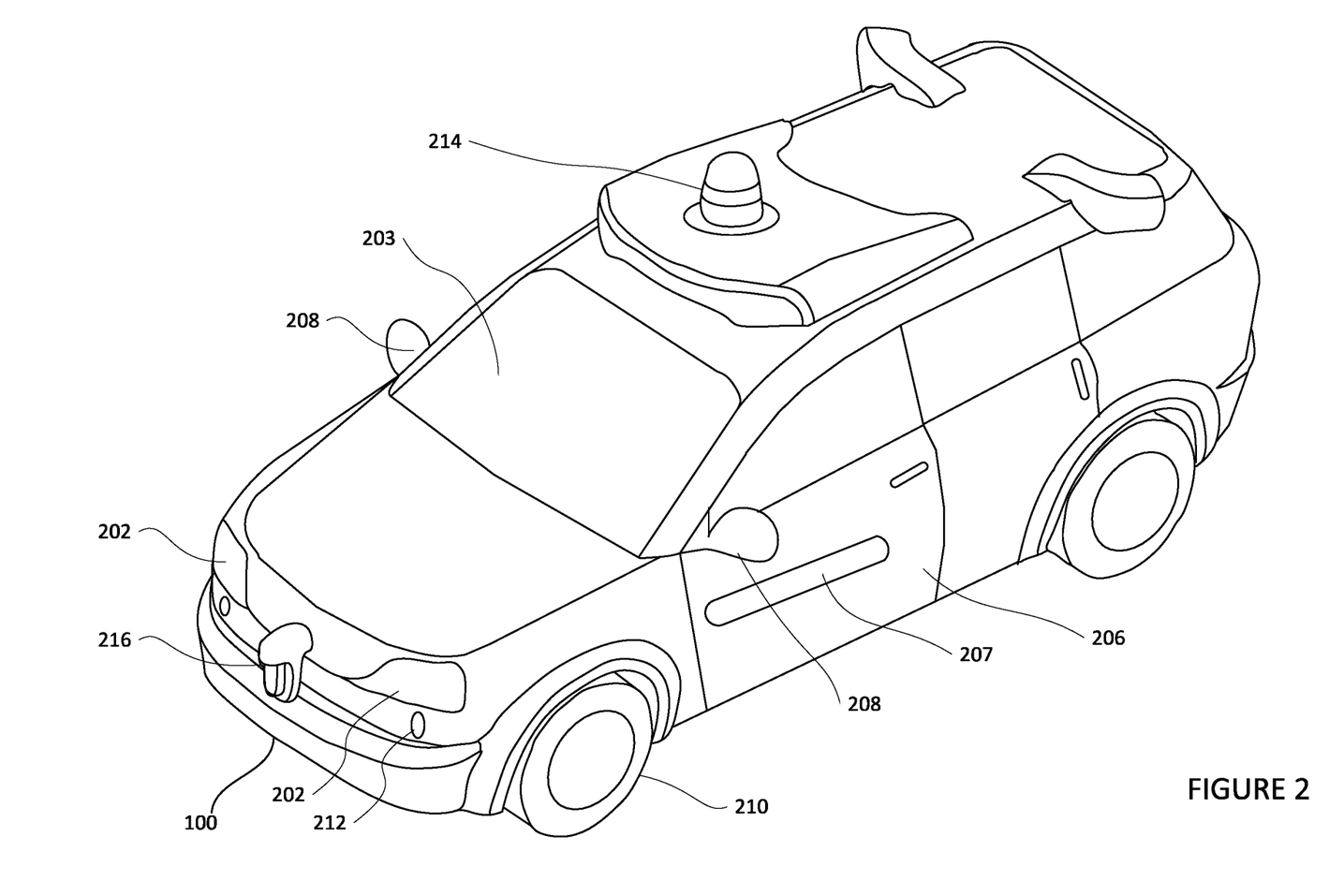
FIG. 2 is a perspective external view of a vehicle in accordance with aspects of the disclosure.
Figure 3:
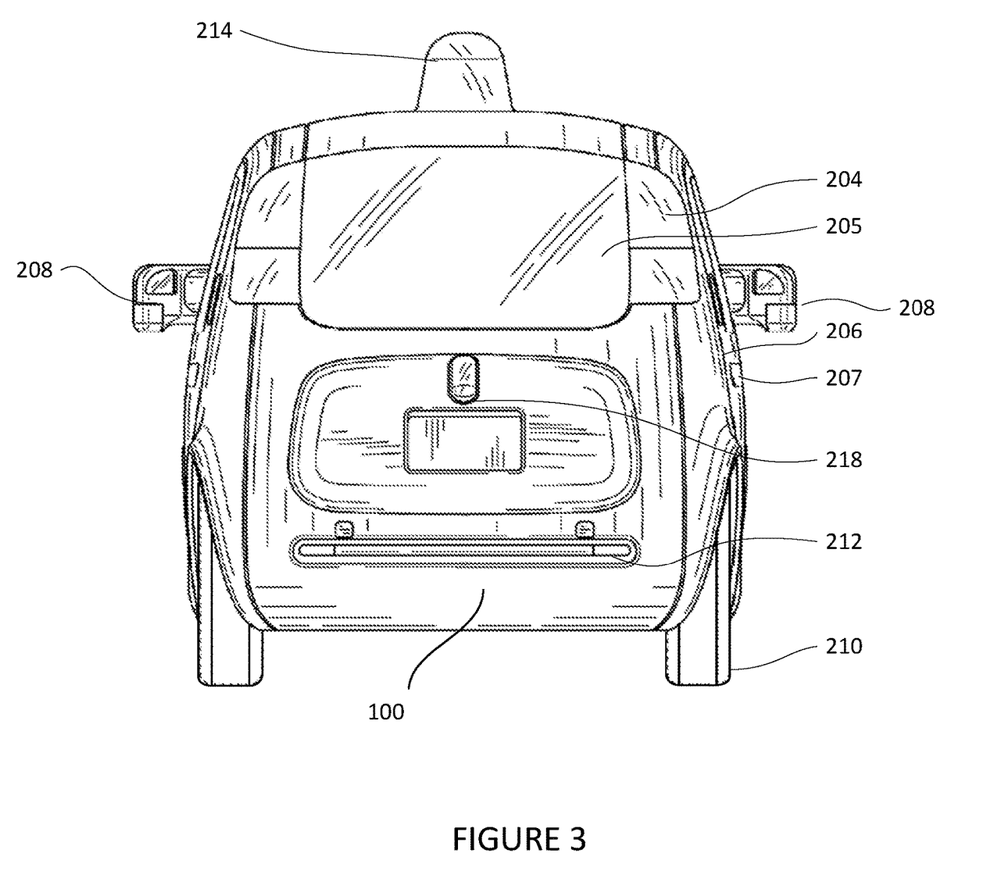
FIG. 3 is a rear external view of a vehicle in accordance with aspects of the disclosure.
Figure 4:
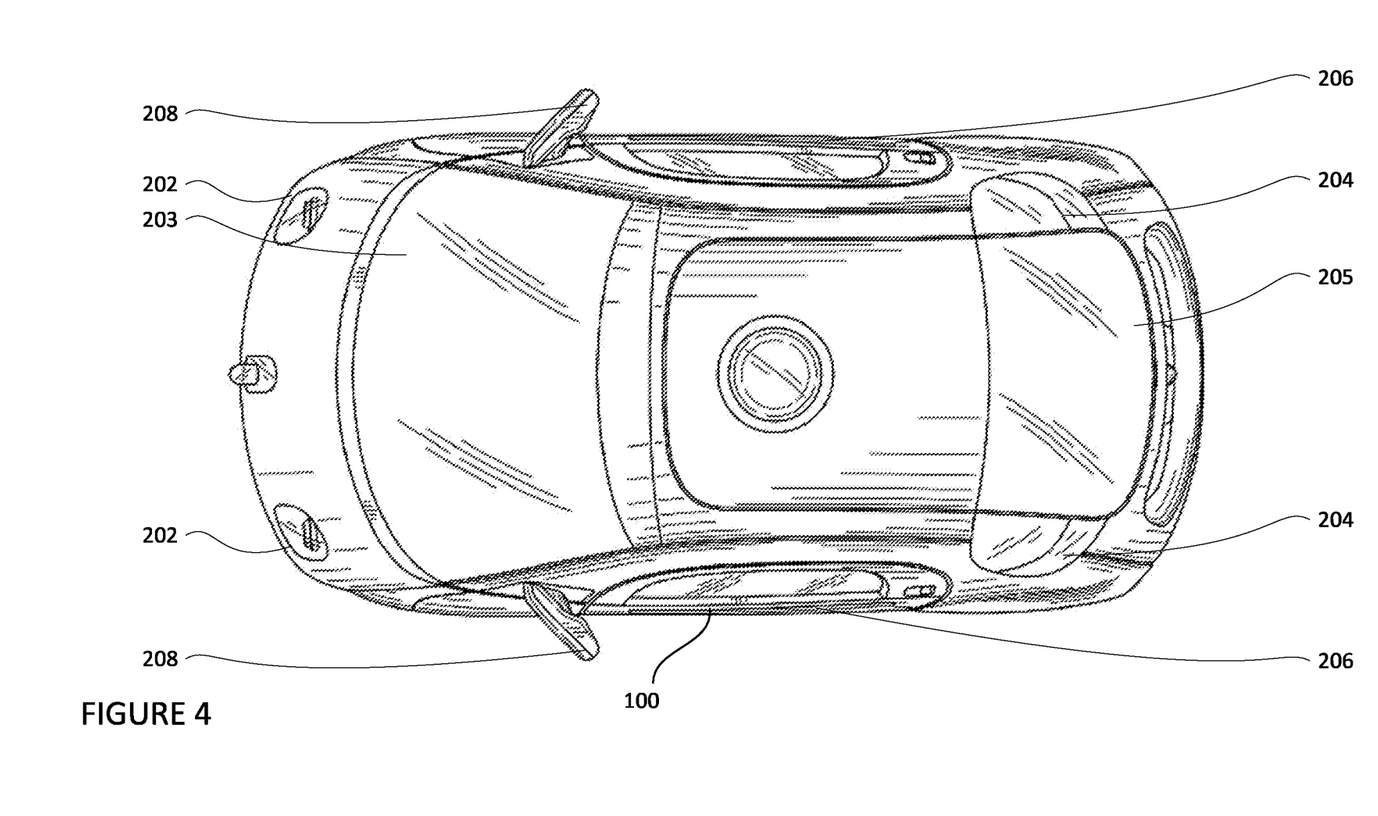
FIG. 4 is a top-down external view of a vehicle in accordance with aspects of the disclosure.

FIGS. 2-4 are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated the signaling system 166. Light bar 207 may also be associated with the signaling system 166.

Vehicle 100 also includes sensors of the perception system 172. For example, housing 214 may include one or more laser devices for having 360 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing device 110.

The computing device 110 may control the direction and speed of the vehicle by controlling various components. By way of example, computing device 110 may navigate the vehicle to a destination location completely autonomously using data from the detailed map information and navigation system 168. In order to maneuver the vehicle, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing device 110 may also control the drivetrain of the vehicle in order to maneuver the vehicle autonomously.

The one or more computing device 110 of vehicle 100 may also receive or transfer information to and from other computing devices.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As described above, the video display system 176 may receive information in order to generate video. In this regard, as the vehicle carries passengers on a trip to a destination, the vehicle's video display system may monitor system data generated by the other computing devices regarding the vehicle's operation including data generated by the vehicle's navigation system, positioning system, and perception system. For instance, the data received by the video display system 176 may include objects external to the vehicle within a particular range from the vehicle's perception system 172, data from the positioning system 170, such as the vehicle's current location, and data from the navigation system 168, such as the vehicle's projected trajectory and map information.

Figure 5A:
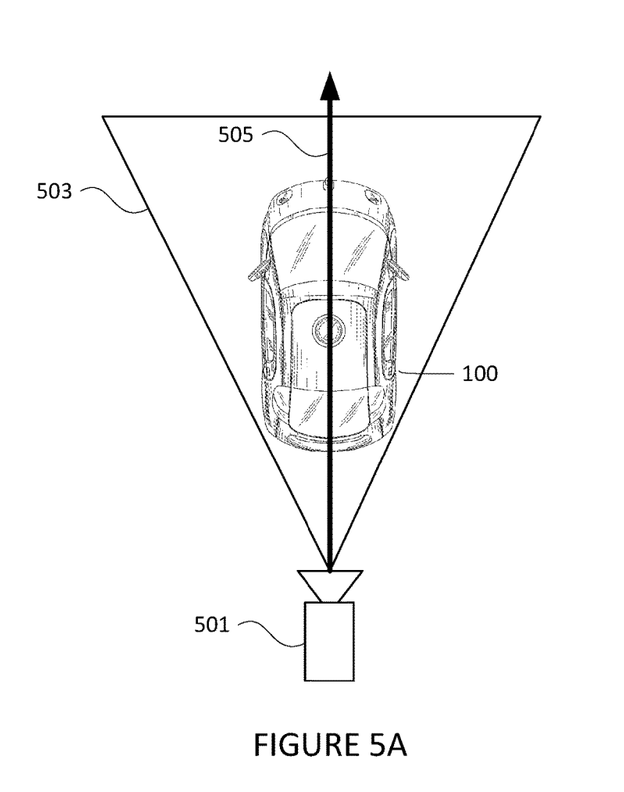
FIGS. 5A and 5B are illustrations of a virtual camera positioned at a default position in accordance with aspects of the disclosure.
Figure 5B:
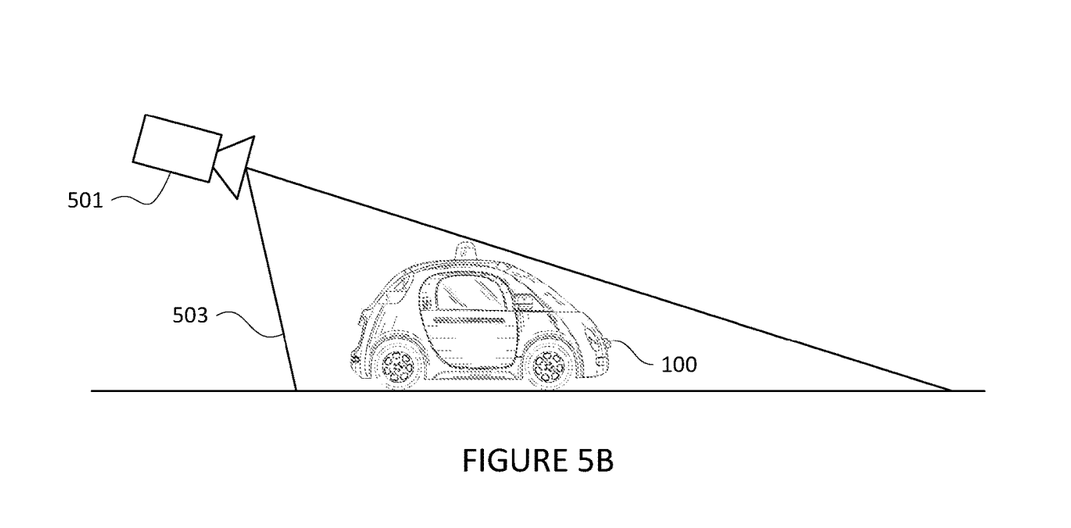

Based on the data received by the video display system, a video may be generated for display on a display in the vehicle for viewing by the vehicle's passengers. The video display system may generate the video from a perspective of a virtual camera using the received data by overlaying the vehicle's projected trajectory and detected objects on a map corresponding to the route the vehicle is traveling. The perspective of a virtual camera may be fixed relative to the vehicle at a default position. For instance, this default position of the fixed position virtual camera 501 may be above and to the rear of the vehicle 100 and directed in a first heading 505, as shown in FIGS. 5A and 5B. The video may include imagery within a set field of view 503 corresponding to the first heading 505 and position of the fixed position virtual camera 501.

Figure 6:
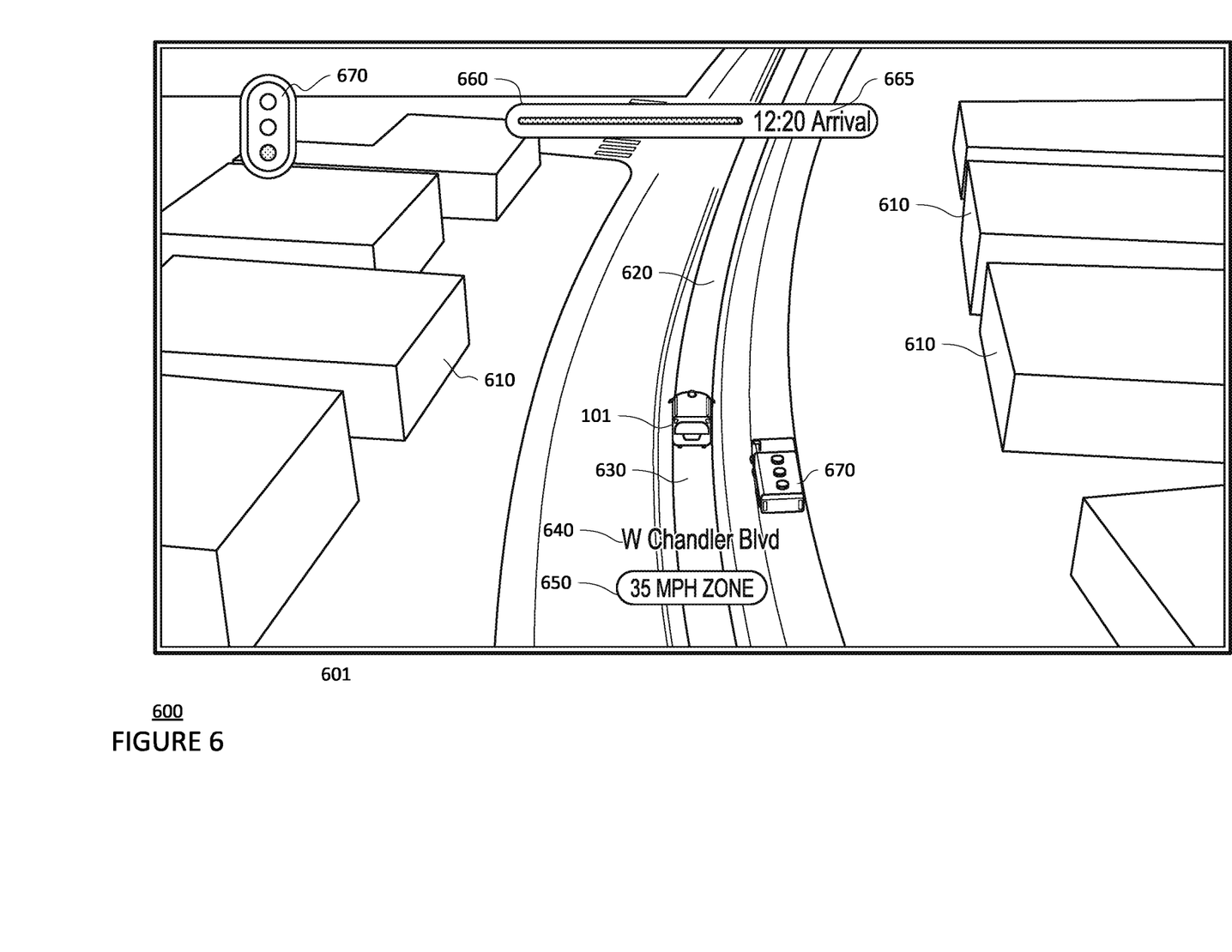
FIG. 6 is an illustration of a video frame showing a field of view of a virtual camera in accordance with aspects of the disclosure.

One frame of a video generated by the video display system from the perspective of a virtual camera positioned in the default position above and behind the vehicle, is shown in FIG. 6. A frame 600 of the video containing a map 601 presented within a set field of view 503 of the virtual camera. The video further includes a virtual representation of the virtual vehicle 101 and the vehicle's surroundings, such as buildings 610, nearby vehicles 670, and other such surroundings, overlaid on the map 601 received from the navigation and perception systems 168 and 172. The location of the virtual vehicle 101 may be determined based on information received by the video display system 176 from the vehicle's position system. The vehicle's projected trajectory 620 and past route 630, received from the positioning system 170 and/or navigation system 168 are also overlaid on the map 601.

Additional messages, such as the current road the vehicle is travelling on 640, the speed limit of the road 650, the progress of the trip 660, the time to arrival 665, and a motion indicator 670, which shows whether the vehicle is free to move, slowing down, or stopped, may also be overlaid on the video. Such additional messages may be generated by the vehicle's computing device 110 based on information received by the vehicle's other systems, such as systems 160-174. The video may include animations, illustrations, live-action, and/or other such content typically found in videos.

Figure 7:
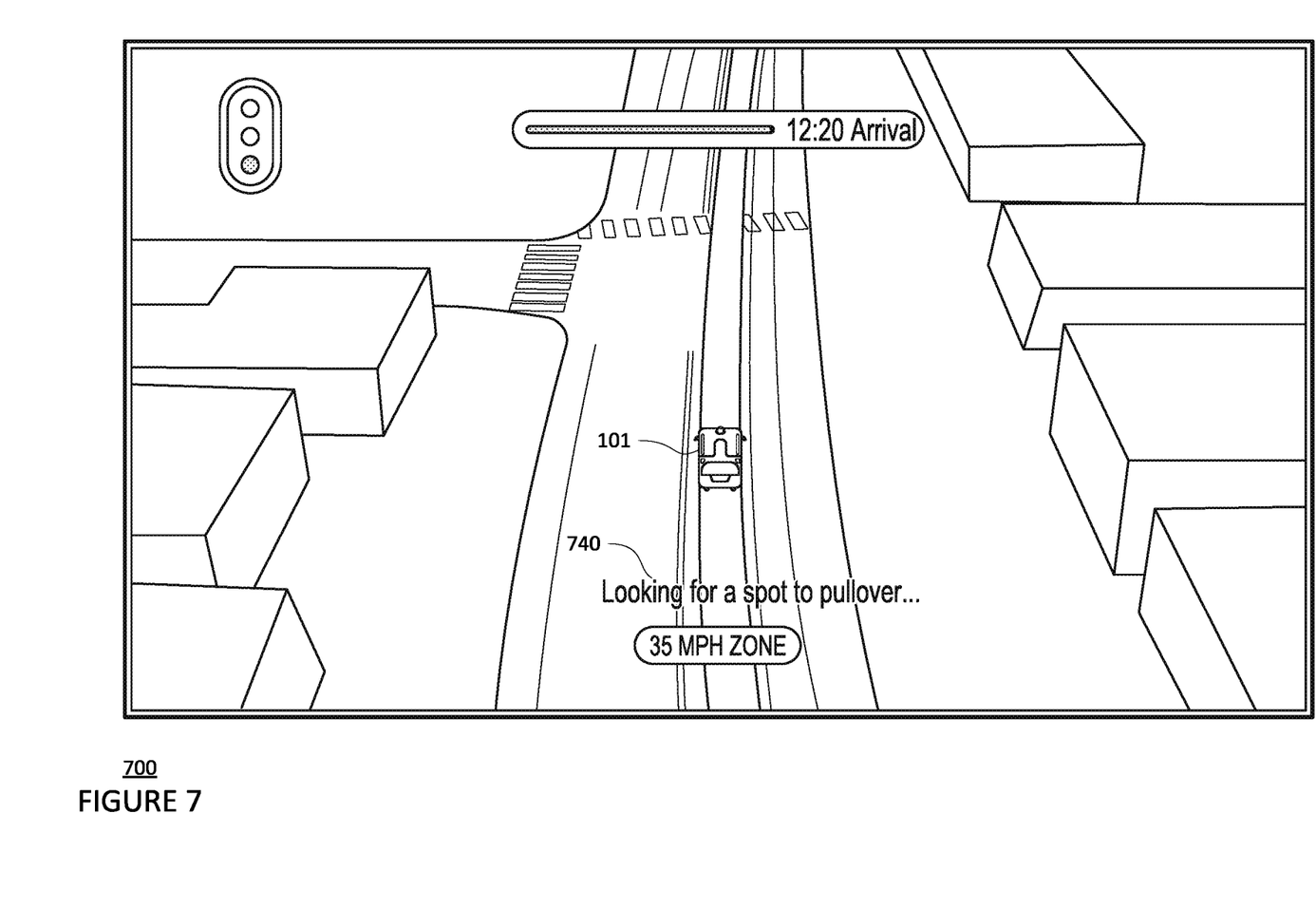
FIG. 7 is an illustration of a video frame showing a field of view of a virtual camera in accordance with aspects of the disclosure.

As the vehicle approaches the final destination, another message may be displayed, or the video being displayed may be changed to indicate that the vehicle is looking for a place to pull over. In this regard, upon the vehicle reaching a threshold, such as a predefined time or distance away from reaching the destination, one or more messages on the screen may be changed to show that the vehicle is going to begin to pull over. For example, the vehicle's computing system may determine that the vehicle 100 is a minute away from reaching its destination. Upon determining that the vehicle 100 is a minute away from reaching its destination, the vehicle's computing device, such as computing device 110, may send a notification to the video display system 176 to display a new message 740, as shown in frame 700 of FIG.

7. The new message 740 may indicate that the vehicle is about to pull over and may replace message 640. The new message 740 may inform the passenger that the trip is nearly complete and that they may begin to get ready to exit the vehicle.

The threshold for displaying an indication that the vehicle is looking for a place to pull over may alternatively be based on distance. In this regard, the threshold may be defined by distance of the vehicle to the destination along the route. For instance, the threshold may be set to 0.25 miles, or more or less. Upon the vehicle being positioned 0.25 miles from the destination, the new message 740 indicating that the vehicle is about to pull over may be displayed. In some instances, further indicators that the vehicle is going to perform a pullover may include flashing all or a portion of the currently displayed video, such as by flashing the virtual representation of the virtual vehicle 101, displaying additional messages, etc.

Figure 8:
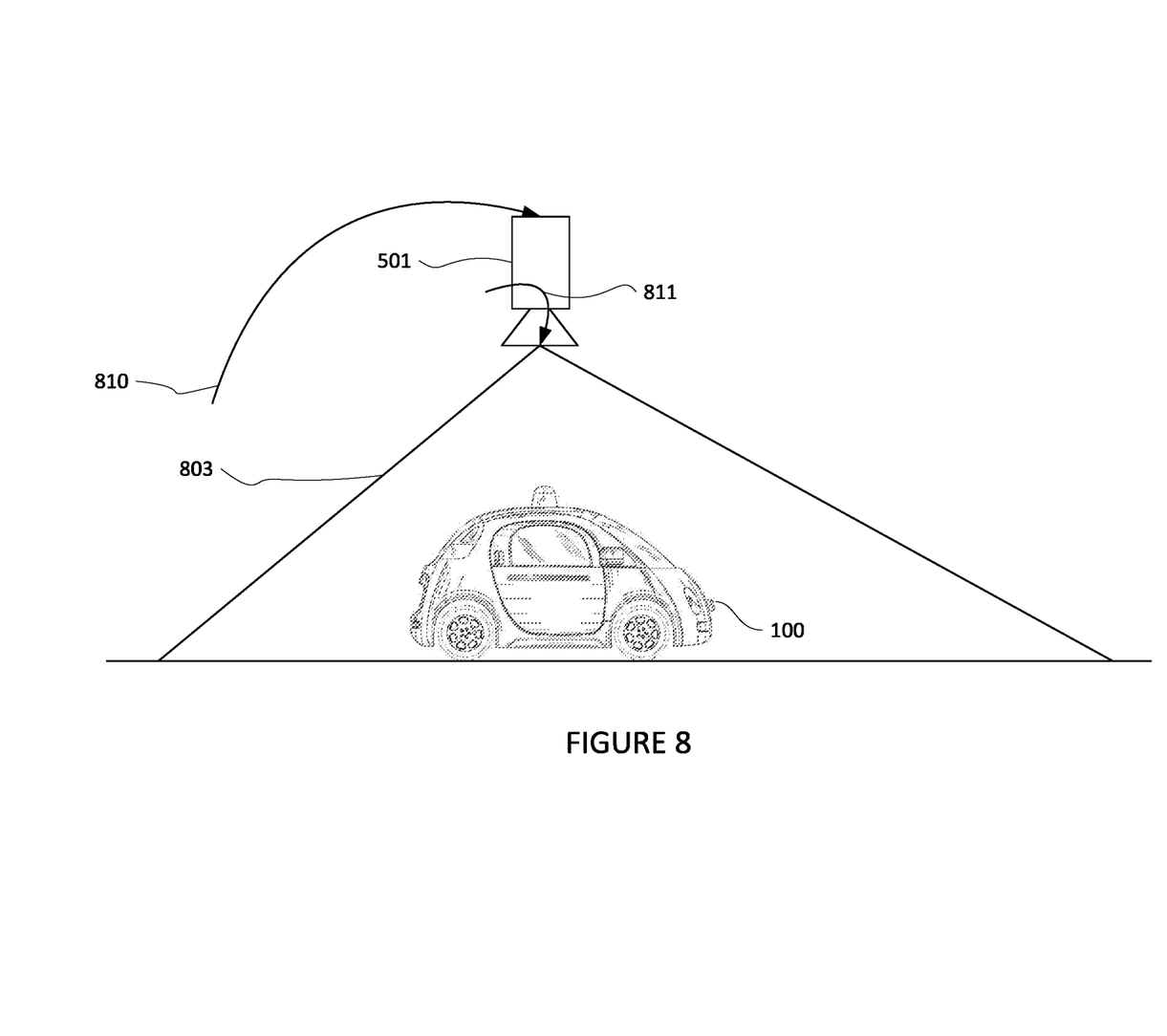
FIG. 8 is an illustration of a virtual camera rotating to capture an updated field of view in accordance with aspects of the disclosure.

Upon the vehicle beginning to perform a pullover, the virtual camera may be rotated or otherwise translated to a predetermined height. In addition, the pitch of the virtual camera may be adjusted allowing the virtual camera to capture imagery within an adjusted field of view corresponding to the virtual cameras new position. As such, the virtual camera may capture a larger area of the vehicle's environment, including a larger area behind and around the vehicle in comparison to the default position, thereby informing passengers of their surroundings when they exit the vehicle. For instance, the position of the virtual camera may be rotated in a first direction 810 above the vehicle 100 to a predetermined height to present video within an adjusted field of view 803 corresponding to the vehicle's immediate surroundings, as shown in FIG. 8. In some instances, the display may flash or some other indicator, such as a visual message or graphic may be displayed to inform the passenger that a pullover location has been found.

The pitch of the virtual camera may be adjusted concurrently, or sequentially with, the rotation of the virtual camera. For instance, as the virtual camera rotates from the default position to above the vehicle 100, the pitch of the virtual camera 501 may be rotated in a second direction 811 such that the video will provide more imagery around the vehicle than provided by the default pitch, as further shown in FIG. 8. Although the above example shows the virtual camera 501 changing position and pitch upon beginning a pullover maneuver in order to bring the vehicle to a stop in an appropriate location and allow one or more passengers to exit the vehicle, the virtual camera may rotate and its pitch may be adjusted, for instance, once the vehicle begins looking for a pullover location, a set time after the vehicle begins looking for a pullover location, or after the vehicle has come to a complete stop, etc.

Figure 9:
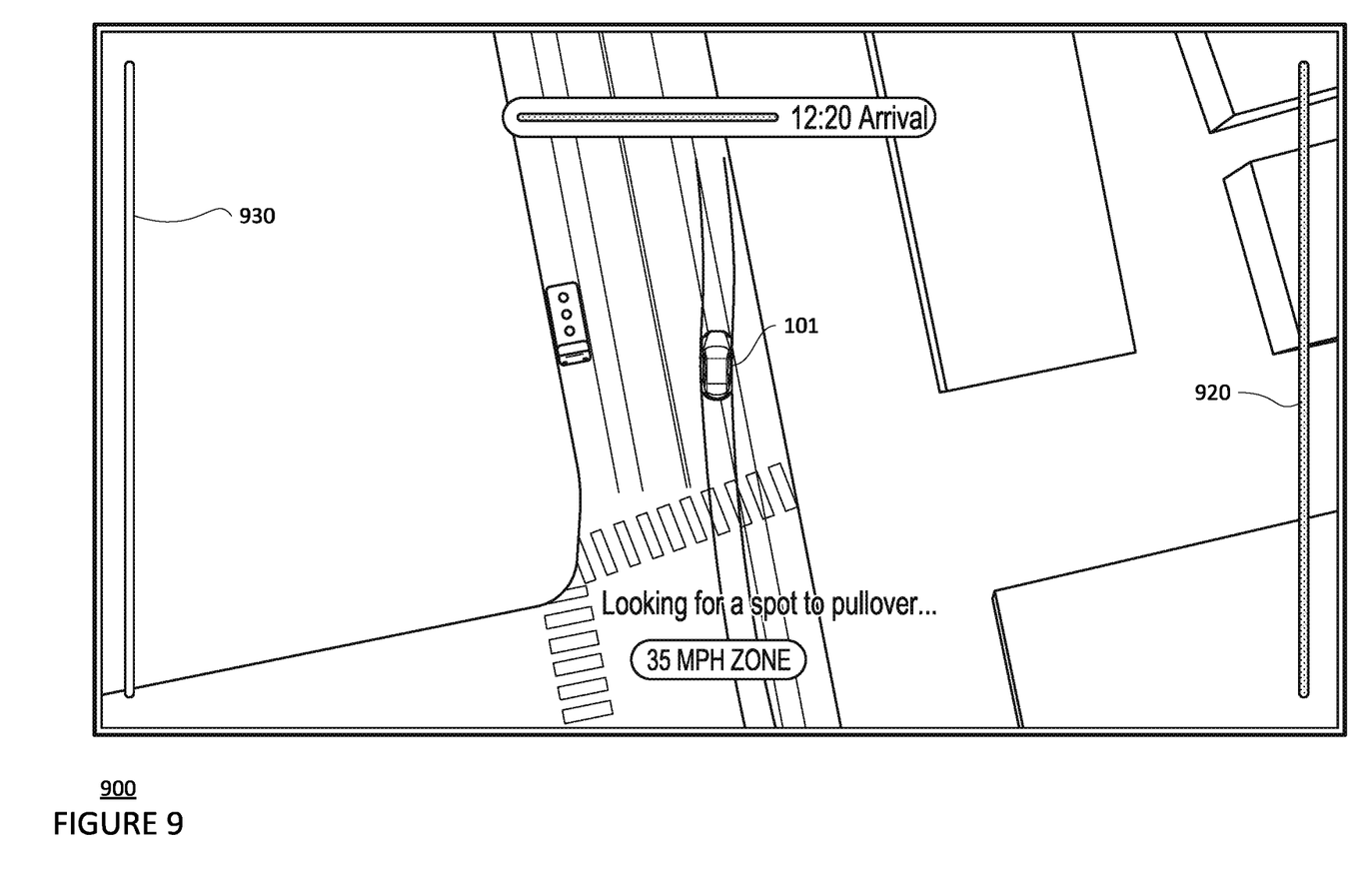
FIG. 9 is an illustration of a video frame showing a top-down field of view of a virtual camera in accordance with aspects of the disclosure.

An example video frame 900 depicting a video generated by the video display system from the perspective of a virtual camera's new position is shown in FIG. 9. Here the video frame 900 shows a top-down perspective of the virtual vehicle 101 along with the vehicle's surroundings located in front of, behind, and otherwise around the vehicle, such as building 920 after the virtual camera has been rotated and its pitch adjusted as described above. The larger area of the vehicle's environment may provide the passenger with knowledge of what is behind the vehicle so there are no blinds spots as the vehicle performs the pullover.

The video display system may provide a visual indicator within the generated video that indicates the direction in which the vehicle is or is going to be pulling over. In this regard, the video display system may, upon receiving a notification that the vehicle is going to pullover, overlay a visual indicator, such as a bar, chevrons, or other such indicator, on the video to inform the vehicle's passengers that a pullover to a particular side of the road is going to occur. For instance, as further shown in FIG. 9, the video display system overlays bars 920 and 930 on the right and left side of the video. The bar which corresponds to the direction that the vehicle is pulling over towards may be highlighted as shown in bar 920. In some instances, the bar corresponding to the direction the vehicle is going to pull over towards may be pulsed or otherwise animated to indicate the pullover direction of the vehicle to the passenger.

One or more sounds may be played to alert the passengers that the trip is at or nearing completion. For instance, audio clips, such as audible beeps, music, a recorded or computer voice saying some phrase indicating that the trip is nearing or at completion may be played within the vehicle to provide the passengers with information regarding the vehicle's actions.

Figure 10:
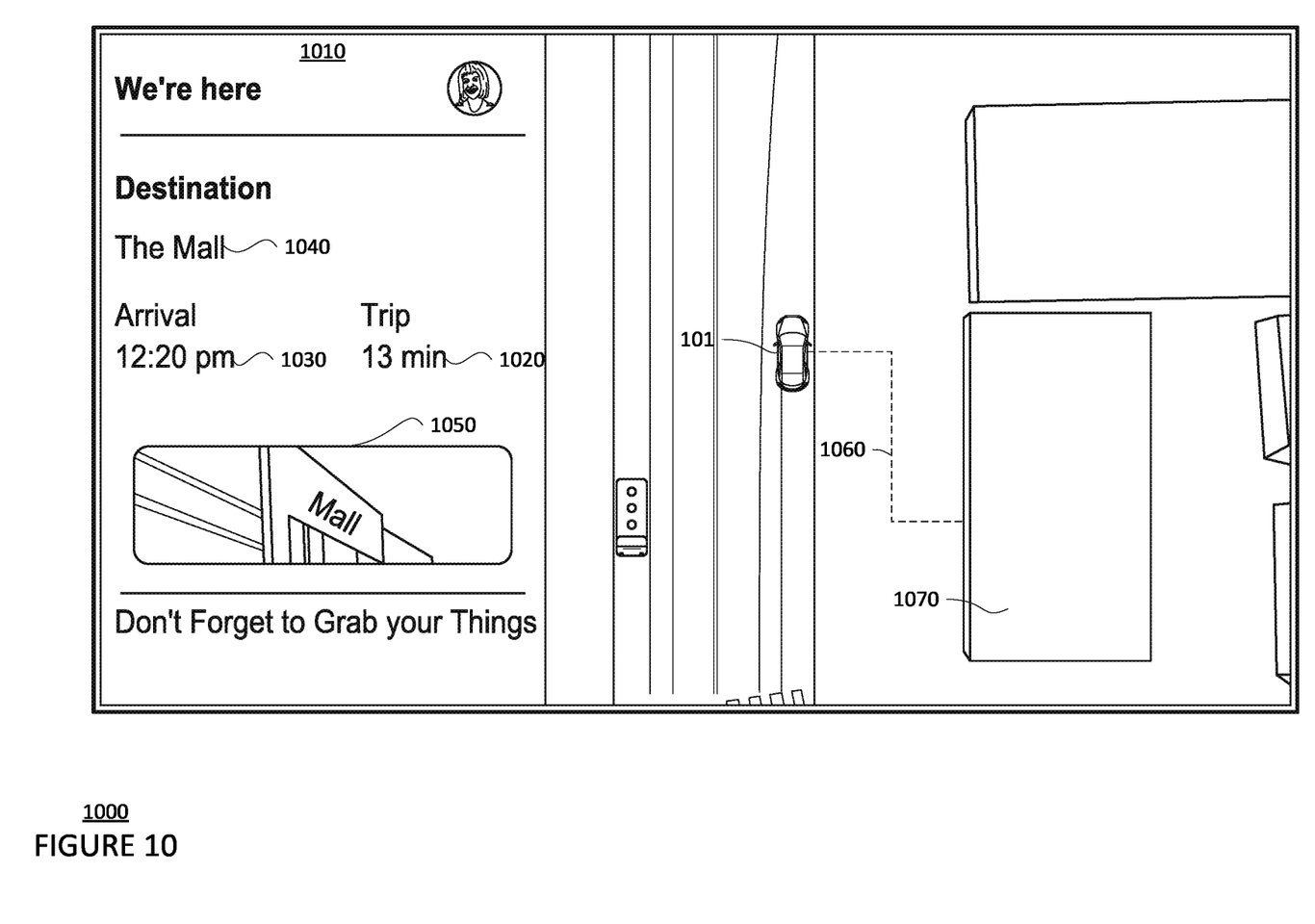
FIG. 10 is an illustration of messages and indicators overlaid on a video in accordance with aspects of the disclosure.

At, or near the completion of the trip, the video display system may provide a summary of the trip and additional details which may be helpful for the passenger as they leave the vehicle. In this regard, a summary of the trip may be overlaid on the video to provide the passenger with a summary of particular details of the trip, such as details regarding the trips length, time of the trip, the destination, the starting point, and other such details. For instance, a trip summary 1010 including the length of the trip 1020, the time of arrival 1030, and the name of the destination 1040 and an image of the destination 1050 may be overlaid on the video, as shown in the video frame 1000 of FIG. 10.

Additional details may be displayed by the video display system in order to further assist the passenger on reaching their destination after exiting the vehicle. For instance, as the vehicle approaches, or reaches the pullover location the passenger's destination 1070 may be highlighted and a walking path 1060 may be displayed from the virtual vehicle 101 to the destination 1070, as further shown in FIG. 10. In this regard, the entire destination, a portion, or an outline of the destination may be highlighted. In some instances, highlighted building may be pulsed to further differentiate it from surrounding buildings and to bring the passenger's attention to the building. The walking path 1060 may be animated, with dots or a line progressing from the virtual vehicle 101 to the building to further inform the passenger how they may reach their destination 1070.

Upon reaching the destination (i.e., pullover location), the vehicle display system may provide additional messages to the passenger. For instance, after the vehicle reaches its destination, but the passenger is still in the vehicle, a message may be provided on the display asking the passenger whether he or she is still in the vehicle and/or whether they need assistance. In some instances the vehicle may provide a message indicating that the vehicle is about to leave.

Figure 11:
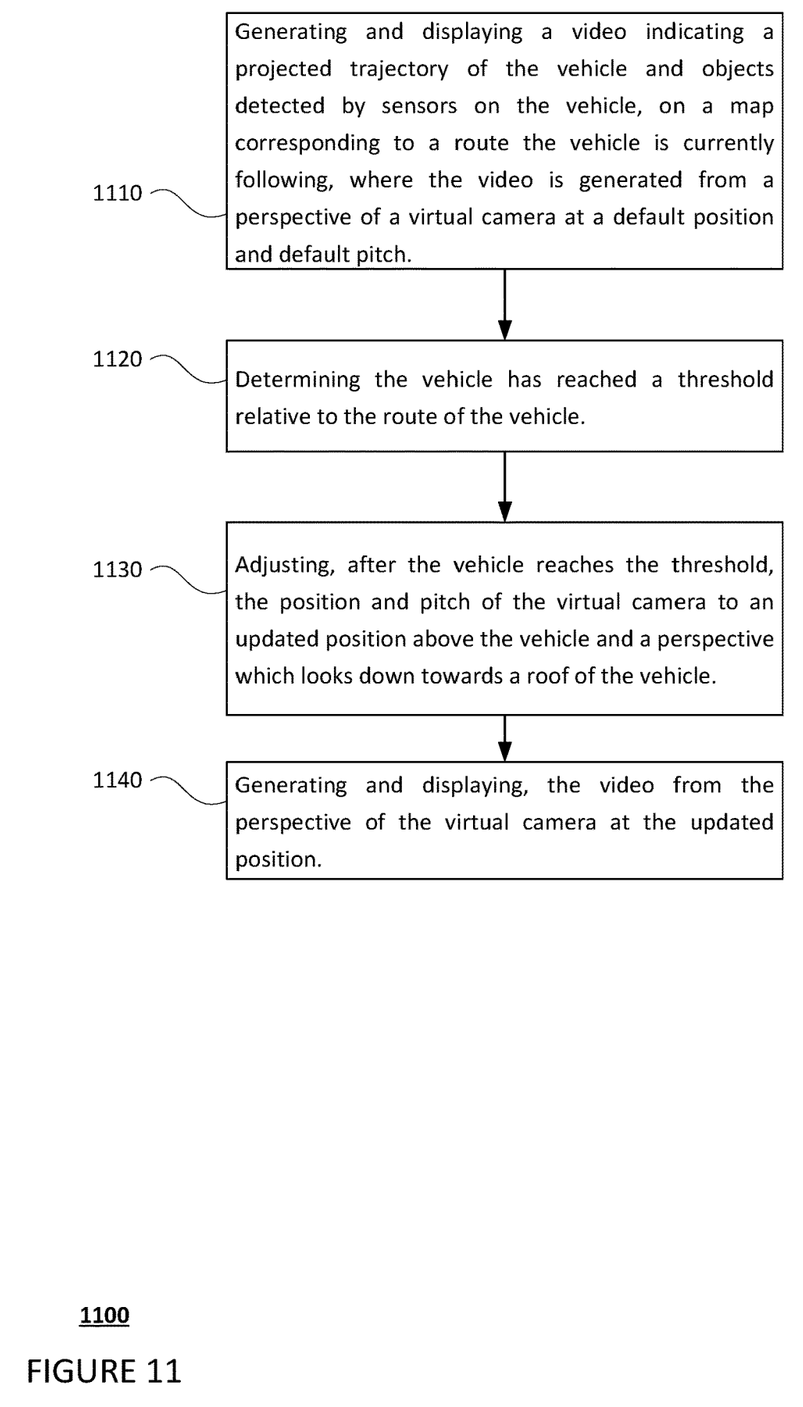
FIG. 11 is a flow diagram in accordance with aspects of the disclosure.

FIG. 11 is an example flow diagram 1100 which may be performed by one or more computing devices of a vehicle, such as computing device 110 of vehicle 100 in order to provide an end of trip sequence when a vehicle is nearing its destination. In this example, the computing one or more computing devices may generate and display a video indicating a projected trajectory of the vehicle and objects detected by sensors on the vehicle, on a map corresponding to a route the vehicle is currently following, where the video is generated from a perspective of a virtual camera at a default position and default pitch, as shown in block 1110.

The one or more computing devices may determine the vehicle has reached a threshold relative to the route of the vehicle and adjust the position and pitch of the virtual camera to an updated position above the vehicle and a perspective which looks down towards a roof of the vehicle, as shown in blocks 1120 and 1130, respectively. The one or more computing devices may generate and display the video from the perspective of the virtual camera at the updated position, as shown in block 1140.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for providing an end of trip sequence when a vehicle is nearing a destination, the method comprising:
   generating and displaying, by one or more computing devices, a video indicating a projected trajectory of the vehicle, on a map corresponding to a route the vehicle is currently following, where the video is generated from a perspective of a virtual camera at a default position and a default pitch behind the vehicle;
   determining, by the one or more computing devices, that the vehicle is a predefined time away from reaching the destination;
   in response to the determining that the vehicle is the predefined time away from reaching the destination, beginning to look, by the one or more computing devices, for a pullover location as the vehicle approaches the destination; and
   at a set time after the one or more computing devices begins to look for the pullover location, adjusting, by the one or more computing devices, the perspective of the virtual camera from the default position and the default pitch by increasing pitch of the virtual camera from the default pitch relative to a road surface.

2. The method of claim 1, wherein the method further comprises:
   determining, by the one or more computing devices, the vehicle is approaching the destination; and
   generating and overlaying on the video, by the one or more computing devices, a walking path to a building, wherein the building is highlighted and pulsed to differentiate the building from surrounding buildings.

3. The method of claim 1, further comprising:
   generating and displaying a trip summary including details of a trip upon the vehicle reaching the destination.

4. The method of claim 1, further comprising:
   generating and displaying a walking path overlaid on the video, wherein the walking path illustrates a path from the vehicle to a passenger's final destination as the vehicle approaches or reaches the pullover location.

5. The method of claim 4, wherein the passenger's final destination is highlighted in the video, and an image of the destination is displayed.

6. A system for providing an end of trip sequence when a vehicle is nearing a destination, the system comprising one or more processors configured to:
   generate and display a video indicating a projected trajectory of the vehicle, on a map corresponding to a route the vehicle is currently following, where the video is generated from a perspective of a virtual camera at a default position and a default pitch behind the vehicle;
   determine that the vehicle is a predefined time away from reaching the destination;
   in response to the determination that the vehicle is the predefined time away from reaching the destination, begin to look for a pullover location as the vehicle approaches the destination; and
   at a set time after the one or more processors begin to look for the pullover location, adjust the perspective of the virtual camera from the default position and the default pitch by increasing pitch of the virtual camera from the default pitch relative to a road surface.

7. The system of claim 6, wherein the one or more processors are further configured to:
   determine the vehicle is approaching the destination; and
   generate and overlay on the video a walking path to a building, wherein the building is highlighted and pulsed to differentiate the building from surrounding buildings.

8. The system of claim 6, wherein the one or more processors are further configured to:
   generate and display a trip summary including details of a trip upon the vehicle reaching the destination.

9. The system of claim 6, wherein the one or more processors are further configured to:
   generate and display a walking path overlaid on the video, wherein the walking path illustrates a path from the vehicle to a passenger's final destination as the vehicle approaches or reaches the pullover location.

10. The system of claim 9, wherein the passenger's final destination is highlighted in the video, and an image of the destination is displayed.

* * * * *